July 29, 1924.
S. Q. SHANNON
AUTO LOCK AND TRACTION DEVICE
Filed May 25, 1922
1,503,210
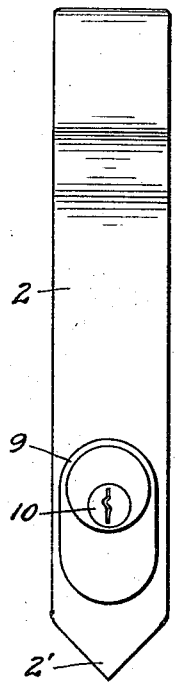
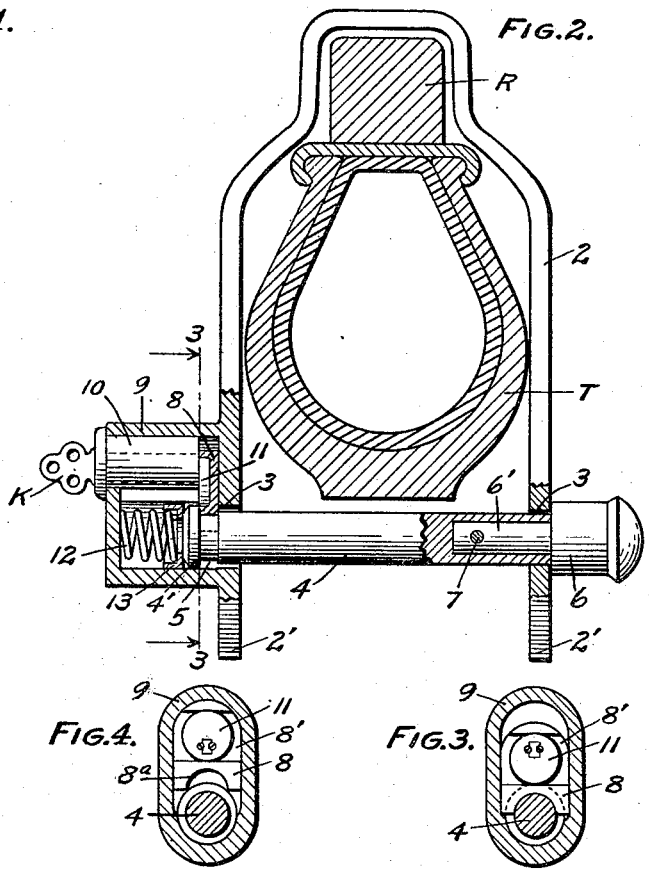
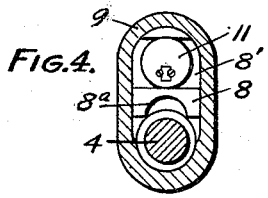
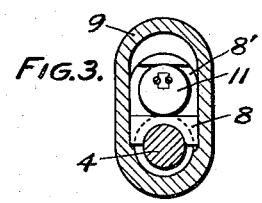
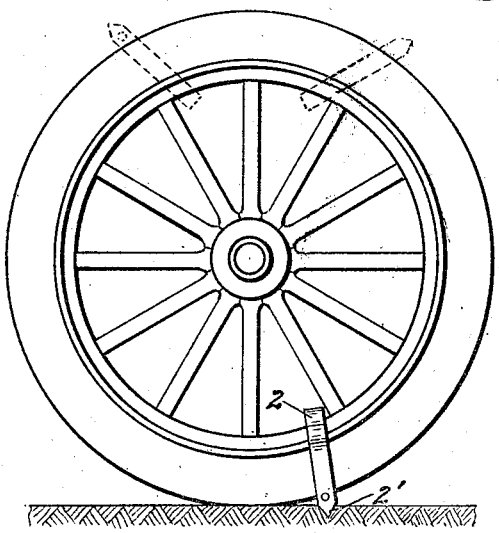
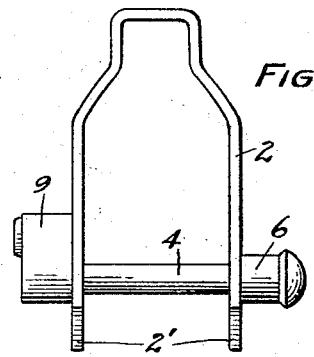
INVENTOR
S. Q. SHANNON
BY Hazard & Miller
ATT'YS.

Patented July 29, 1924.

1,503,210

UNITED STATES PATENT OFFICE.

S. Q. SHANNON, OF LOS ANGELES, CALIFORNIA, ASSIGNOR TO DONALD R. MORRISON, OF LOS ANGELES, CALIFORNIA.

AUTO LOCK AND TRACTION DEVICE.

Application filed May 25, 1922. Serial No. 563,590.

*To all whom it may concern:*

Be it known that I, S. Q. SHANNON, a citizen of the United States, residing at Los Angeles, in the county of Los Angeles and State of California, have invented new and useful Improvements in Auto Locks and Traction Devices, of which the following is a specification.

This invention relates to a form of device adapted to be applied to the rim and tire of a vehicle, such for instance as an automobile, and which while applied will indicate a surreptitious movement of the vehicle while the instrument is in place.

An object of the invention is to provide a tell tale and traction device of most inexpensive construction and which possesses the requisite degree of strength with the minimum weight thereby enabling the ready application of the device to a tire and rim with but little exertion. Another object is to provide a simple but effective locking means for the device.

Other objects will be made manifest in the following specification of an embodiment of the invention illustrated in the accompanying drawings, in which Figure 1 is a side elevation of the lock carrying side of the device.

Fig. 2 is an end or edge elevation of the device as applied and showing parts thereof in section.

Fig. 3 is a section on line 3—3 of Fig. 2 showing the bolt latch in thrown or engaging position.

Fig. 4 is a section on a similar plane showing the bolt latch retracted.

Fig. 5 is a side elevation of a wheel showing the device applied.

Fig. 6 is an edge view of the device in elevation.

The present invention is an improvement of the type of device shown in Letters Patent No. 1,337,568, dated April 20, 1920, wherein a theft signal device is shown as comprising a substantially U-shaped yoke member.

In the above mentioned patent the device is shown as provided with a padlock and by which a main bolt is adapted to be fastened in effective locking position on the yoke member. The present invention involves improved locking means for the bolt member.

A preferred form of the tire lock and signal device consists of a substantially straplike bar 2 bent into practically a U-shaped form having its bar or transverse connecting portion designed to approximate the transverse section of a vehicle rim R when the yoke 2 is applied with its parallel arms extending substantially radially as to the tire T. The yoke arms project a substantial distance beyond the tread of the tire and may be provided with traction points 2', both for the purpose of making traction mark when the wheel is rotated with the device in locked position, and also for the purpose of adding traction when the device is utilized to extricate the wheel from difficult traction situations.

The end portions of the yoke arms are each perforated at 3—3, the perforations being in alinement so that a transverse bolt 4 may be shifted into effective position across the tread of the tire as shown in Fig. 2. One of the bolt apertures 3 provides a free sliding fit for the bolt shank, while the aperture of the opposite end of the yoke is sufficiently large to provide for the insertion and retraction of a flange 4' provided on one end of the bolt and behind which there is preferably formed an annular groove 5 which is designed to be passed to one side of one arm of the yoke when a head 6 at the other end of the bolt 4 abuts the contiguous arm of the yoke. For convenience of assembly and low cost of construction, the head 6 may be provided with a shank 6' to be driven into a bore in one end of the bolt 4 after which the shank 6' can be pinned or otherwise permanently secured in place as by the diametrical pin 7.

When the bolt 4 is in applied effective position as in Fig. 2, its slotted neck portion 5 lies adjacent to a latch member 8 disposed in the bottom of a lock chamber 9 formed integrally or otherwise provided on the outer side of one of the yoke arms, and in which chamber there is mounted a cylinder lock 10 having on the inner end of the cylinder an eccentric 11 disposed to engage opposite walls formed by recessing at 8' one face of the latch or sliding member 8. When a key K is inserted in the cylinder lock, the eccentric 11 may be rotated to the retracting position, Fig. 4, at which time the latch 8 is withdrawn from engagement with the neck or groove 5 of the bolt 4 and the bolt can be withdrawn or may be freely inserted. Total withdrawal of the bolt 4 is prevented by engagement of the flange 4' of the bolt with the inner face of the yoke bar that is opposite to the lock carrying bar. When the bolt has been inserted fully into the yoke bars, the key K may be applied and thereby the locking eccentric 11 rotated so as to shift the latch 8 into co-operative engagement with the grooved end of the bolt 4 and this therefore will be held against withdrawal. Preferably the acting face of the latch 8 is concaved as at 8ª so as to provide an increased area of contact and additional surface of abutment to secure strength of fastening parts.

Preferably, the bolt 4 will be initially automatically projected from the locking device as soon as it is released by the latch 8, and means are provided to accomplish this purpose. A simple means to that end consists of a compression spring 12 disposed in the lock casing 9 and arranged as in alinement with the bolt 4. One end of the spring 12 engages a ferrule or collar 13 which in turn is designed to be engaged by the contiguous and flanged end of the bolt 4 when the latter is inserted so that the spring 12 will be compressed. As the bolt latch 8 is retracted to unlock the device the spring automatically projects the bolt from the lock casing 9.

From the above it will be seen that the device provides an effective traction means when in use and also serves as a "tattle-tale" indicative of unlicensed movement of a vehicle so long as the "tattle-tale" like instrument is applied.

Various modifications and changes may be resorted to within the spirit of the invention as claimed.

What is claimed is:

1. A "theft-signal" device for vehicle wheels, comprising a yoke-like frame applicable to a rim and tire, a bolt slidable across the tire into position in the ends of the frame arms, one arm having a lock case into which said bolt projects, locking means in said case, and an ejector in said case for clearing the released bolt.

2. A "theft-signal" device for vehicle wheels, comprising a yoke-like frame applicable to a rim and tire, a bolt slidable across the tire into position in the ends of the frame arms, one arm having a lock case into which said bolt projects, and locking means in said case, the lock engaging end of the bolt being concealed in said case, and a spring arranged in said case and aligned with the bolt and having a ferrule to be engaged by the bolt when projected into the case; said spring operating to project the bolt from the case when the bolt is released.

In testimony whereof I have signed my name to this specification.

S. Q. SHANNON.